Sept. 24, 1963  S. R. CUDNOHUFSKY  3,104,591
TRACER CONTROL CIRCUIT FOR MACHINE TOOLS
Filed Dec. 14, 1961  7 Sheets-Sheet 1

INVENTOR.
SYLVESTER R. CUDNOHUFSKY
BY
Barnes, Kisselle,
Raisch & Choate
ATTORNEYS

Sept. 24, 1963 S. R. CUDNOHUFSKY 3,104,591
TRACER CONTROL CIRCUIT FOR MACHINE TOOLS
Filed Dec. 14, 1961 7 Sheets-Sheet 3

INVENTOR.
SYLVESTER R. CUDNOHUFSKY
BY
*Barnes, Kisselle,*
*Raisch & Choate*
ATTORNEYS

United States Patent Office

3,104,591
Patented Sept. 24, 1963

3,104,591
TRACER CONTROL CIRCUIT FOR
MACHINE TOOLS
Sylvester R. Cudnohufsky, 3650 Lapeer Road,
Pontiac, Mich.
Filed Dec. 14, 1961, Ser. No. 159,403
21 Claims. (Cl. 91—412)

This invention relates to improvements in tracer control circuits for governing the automatic operation of pattern controlled machine tools.

More specifically, the invention has to do with the general type of tracer control circuits of the type disclosed in my prior Patent No. 2,940,263, dated June 14, 1960.

Pattern controlled machine tools are usually provided with means for moving the cutting tool in two perpendicularly related directions by means of a pair of hydraulically controlled piston-cylinder assemblies. The degree of relative actuation of the two piston-cylinder assemblies to produce movement of the cutting tool angularly is often determined by the movement of a single stylus or finger in following a template which in turn controls a tracer valve. The design of the tracer control circuit disclosed in my said prior patent included a single pressure compensated flow control valve for controlling the feed rate of both cylinders. Thus, in the patented arrangement, adjustment of the single flow control valve effected a change in the feed rate of both cylinders.

It is an object of the present invention to provide a tracer control circuit wherein the feed rate of the longitudinal and transverse feed cylinders can be controlled and adjusted independently of one another.

A further object of the invention is to provide a tracer control circuit which enables the cutting tool to feed into the work at a steeper angle than heretofore.

Another object of the invention resides in the provision of a tracer control circuit which enables retraction of the cutting tool to the starting position in a rapid manner.

A further object of the invention resides in the provision of a tracer control circuit that enables the operator to control the path of travel of the cutting tool in its retraction movement to the starting position so that in the case of boring, for example, the cutting tool can be retracted to the starting position by causing it first to travel radially of the bore and then axially of the bore so as to not interfere with any of the machine surfaces of the bore.

Another object of the invention resides in the provision of a tracer control circuit which involves a minimum of valves and wherein the valves controlling the operation of the two feed cylinders during the tracing cycle are in the nature of flow control valves as distinguished from directional valves so that the feed cylinders are controlled by the rate of flow and not by the opening and closing of valves.

Other objects and advantages of the invention will become apparent from the accompanying description taken with the drawings, in which:

FIG. 3 is a view similar to FIG. 1 showing the control circuit conditioned for initiating the tracing cycle and with the tracing finger engaging an axially extending edge portion of the template.

FIG. 6 is a diagrammatic view of a modified tracer control circuit embodying the present invention.

In the drawings, the tracer valve is generally designated 10 and has a finger or stylus 12 pivotally mounted thereon for tracing the contour of a pattern or template 14. The tracer valve 10 is of the type disclosed in my prior Patent No. 2,940,263 and need not be described in detail. For the purposes of this description, it will suffice to state that valve 10 has a restrictable orifice therein and the degree of restriction of the orifice depends upon the pivotal movement of stylus 12. In the embodiment illustrated, the hydraulic pressure within valve 10 tends to pivot the stylus 12 in a counterclockwise direction to reduce the restriction in the valve. Pivotal movement of stylus 12 in a clockwise direction increases the restriction in valve 10.

To illustrate the operation of the improved control circuit of this invention, it may be assumed that the tracer is used on a lathe. On such a machine tool, the template 14 would be preferably mounted in fixed position on the bed of the lathe and the tracer valve 10 would be preferably mounted on the cross slide of the lathe which is generally designated 16. A cylinder 18 is mounted on the carriage 20 of the lathe and houses a piston 22 which is connected by a rod 24 with the cross slide 16. A cylinder 26 mounted on the bed of the lathe houses a piston 28 which is connected by a rod 30 with carriage 20. Actuation of piston 28 causes the cross slide and stylus 12 to be fed in a longitudinal direction while actuation of the piston 22 in cylinder 18 causes movement of the cross slide and stylus 12 in a transverse or cross feed direction normal to the longitudinal feed direction. The cutting tool, generally designated 32, is shown mounted on the cross slide 16.

The source of hydraulic fluid under pressure for operating the two cylinders comprises two pumps 34 and 36. Pump 34 may be referred to as the low pressure pump which is capable of developing a relatively low, substantially constant pressure. Pump 34, for example, is capable of delivering five gallons of oil per minute at a pressure of about 400 lbs. per square inch. Pump 36, on the other hand, is referred to as the high pressure pump which is capable of instantaneously developing a relatively high pressure. For example, pump 36 is capable of delivering about five gallons of oil per minute at a pressure of 1000 lbs. per square inch. Both pumps are adapted to be driven by an electric motor 38.

The means for controlling the directional flow of hydraulic fluid through the circuit comprises a solenoid controlled, pilot operated valve 40. Valve 40 is a four-way valve of the three-position, spring-centered type. The pilot valve component of valve 40 is designated 42 while the main directional valve component of valve 40 is designated 44. Low pressure pump 34 connects with the directional valve 44 and with the pilot valve 42 by means of a line 46. Pilot valve 42 is of the conventional type including two solenoids 48 and 50 for shifting the spool of the valve in opposite directions. The opposed operating cylinders 52, 54 of the directional valve 44 are connected with the pilot valve 42 by means of lines 56, 58, respectively.

For the purposes of simplification, in the drawings, the pilot oil lines are shown as broken lines while the actual oil flow lines of the control circuit are shown in solid lines. Furthermore, the oil lines which are operative in any particular portion of the cycle illustrated in the drawings are shown in heavy lines while the oil lines which may be considered as idle during any portion of the cycle are shown in light lines.

The inlet 60 of tracer valve 10 is connected with the high pressure pump 36 by means of a feed inlet line 62. The outlet 64 of tracer valve 10 connects with valve 44 by means of a discharge line 66. It will be observed that in the centered position of valve 44, the discharge line 66 drains to sump as at 68 through the open center of valve 44 and a drain line 70.

The head end of cylinder 18 is adapted to be connected to directional valve 44 by means of a line 72, a two-position, four-way valve 74 operated by a solenoid 76 and a line 78. The rod end of cylinder 18 communicates with feed line 62 as at 79. The rod end of cylinder 18 also communicates indirectly with the discharge line 66 from valve 10 by means of a line 80, a pilot operated relief valve 82, a line 84 in which is located an adjustable flow control valve 86, a line 88 in which is located a pressure compensated adjustable flow control valve 90 and a line 92. The head end of longitudinal feed cylinder 26 connects with line 92 through a line 94 in which is located a check valve 96. Interposed between line 84 on the downstream side of flow control valve 86 and line 94 on the upstream side of check valve 96 is an adjustable flow control valve 98 with a built-in bypass check valve 100. The rod end of cylinder 26 is adapted to connect with directional valve 44 through a line 102, four-way valve 74 and line 78. The head end of cylinder 18 is also adapted to connect with discharge line 92 through a line 104, a pilot operated two-way valve 106 and a line 108 in which is located an adjustable pressure compensated flow control valve 110. Valve 106 is of the spring returned type and is actuated by a hydraulic cylinder 112 which is in turn controlled by a pilot line 114 connected with discharge line 92. One side of valve 106 connects by a line 116 with sump as at 118. An adjustable flow control valve 120 is located in drain line 116. Between its connections with valve 74 and valve 106, line 104 connects with line 78 by means of a bypass line 122 in which there is located in series relation an adjustable flow control valve 124 and a check valve 126.

A relief valve 128 is arranged in feed line 46 and another relief valve 130 is arranged in feed line 62. Valve 128 is set to relieve the pressure in line 46 when it exceeds a predetermined value, say 400 lbs. per square inch; and valve 130 is set to relieve the pressure in line 62 when the pressure in line 62 exceeds a much higher value, for example, 1000 lbs. per square inch. One reason valves 128, 130 are necessary is that flow control valves 90 and 110 in the drain lines 88, 108 are set to deliver a maximum flow less than the capacities of pumps 34 and 36. For example, while pumps 34 and 36 are each capable of delivering five gallons per minute at their rated pressures, valves 90 and 110 are set to permit a maximum flow therethrough of only about two gallons per minute. Flow control valve 86, which, as pointed out, is not pressure compensated, is adjusted to permit a maximum flow intermediate the setting of valve 90 and the maximum flow delivered by pump 36. The pressure at which valve 82 opens, as explained more fully hereinafter, is determined by its setting and the extent to which it opens; and therefore, the amount of oil flowing through valve 82, is determined by the back pressure in feed line 62.

Figure 1:
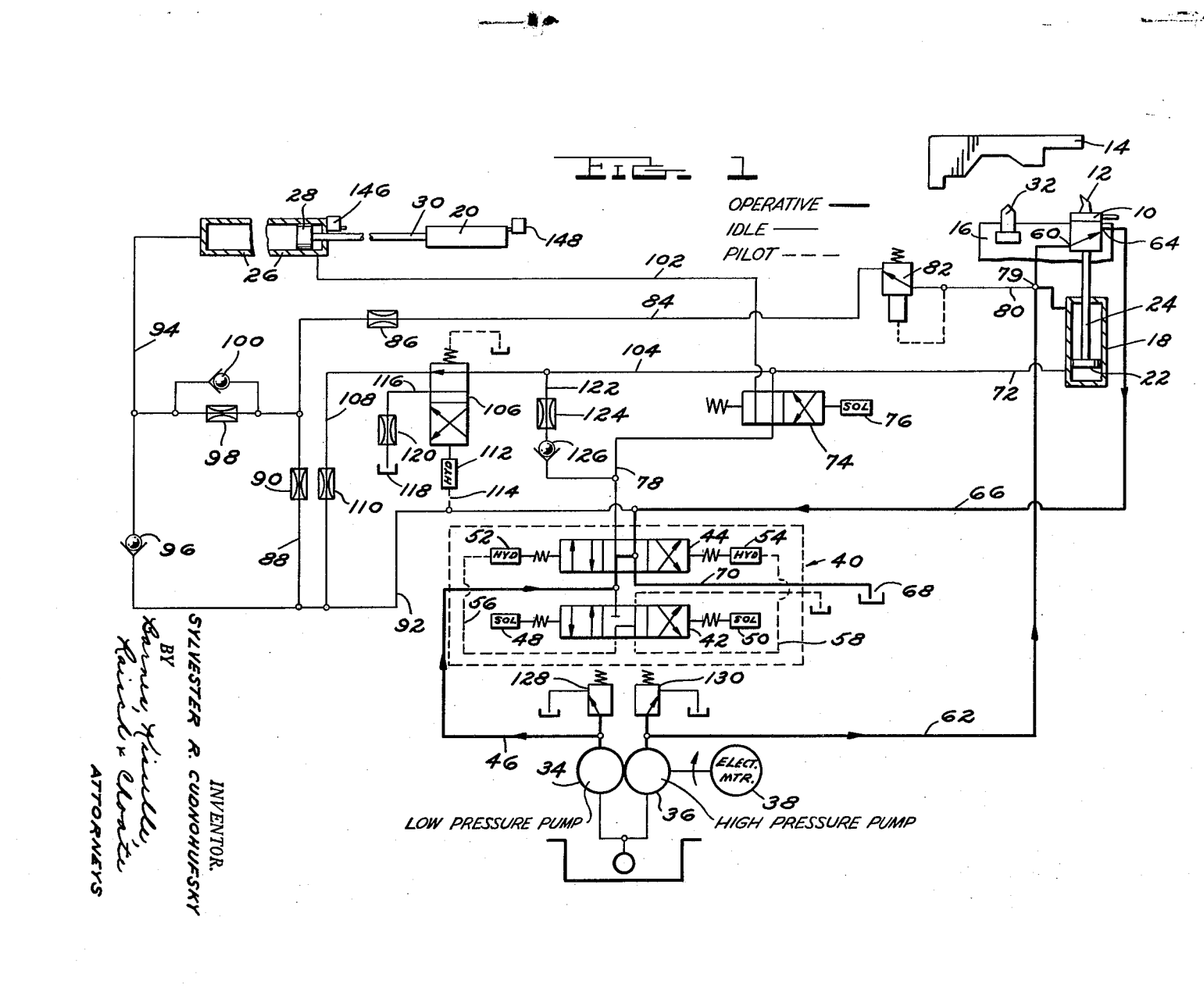
FIG. 1 is a diagrammatic view of a tracer control circuit embodying the present invention, the various valves being shown in the positions assumed with the circuit is energized and running idly.

The operation of the tracer as controlled by the circuit shown in FIGS. 1 through 5 herein will now be described. Referring first to FIG. 1, the circuit is there illustrated in the energized, idling condition. The circuit is set in this condition by closing a main switch, not illustrated, which energizes electric motor 38 that drives pumps 34 and 36. Oil from the high pressure pump 36 thus flows through the feed line 62 to the rod end of cylinder 18 and to the inlet 60 of tracer valve 10. Tracer valve 10 is initially adjusted so that with the orifice therein wide open, a back pressure of a predetermined amount is established in line 62. For example, if the cross slide 16 is such that it requires about 150 lbs. per square inch to retract the cross slide, then valve 10 is set such that when the restriction therein is wide open, a back pressure of about 150 lbs. is established in feed line 62 and in the rod end of cylinder 18. The outlet of valve 10 discharges to sump 68 through line 66, the open center of valve 44 and discharge line 70. It will be noted that the feed line 46 from the lower pressure pump 34 also connects with sump at 68 through the open center of valve 44. The head end of cylinder 18 connects to sump through line 72, valve 74 and line 78. Thus, with the circuit in the energized idling condition, the cross slide 16 is retracted and oil flows idly through the system.

Figure 2:
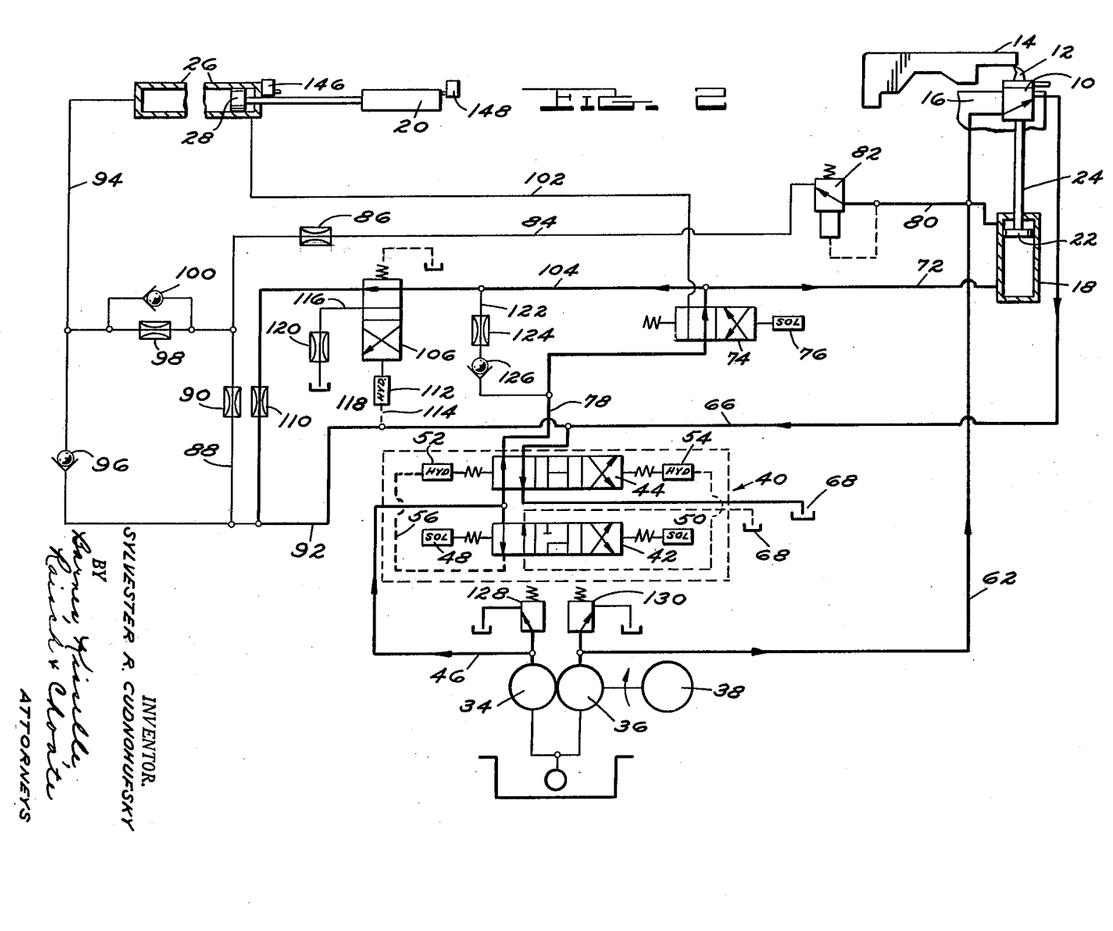
FIG. 2 is a view similar to FIG. 1 showing the control circuit conditioned to cause the tracer finger to approach the template.

When it is desired to have the stylus approach the template, an approach switch (not illustrated) is energized. This energizes solenoid 48 of pilot valve 42 as is shown in FIG. 2. The pressure in pilot line 56 thus actuates cylinder 52 so that the feed line 46 is connected directly with line 78 and the sump 68 is connected with drain line 66. Thus, the low pressure pump 34 delivers oil at low pressure to the head end of cylinder 18 through line 78, valve 74 and line 72. Oil delivered through line 78 in excess of that required by the head end of cylinder 18 drains to sump through line 104, valve 106, pressure compensated valve 110 and drain line 92. The high pressure pump 36 communicates with the rod end of cylinder 18 and the inlet of tracer valve 10 through said line 62. However, since, while the stylus 12 is approaching the template 14, the restriction in valve 10 is wide open, the pressure in the low pressure side of the system and in the head end of cylinder 18 exceeds the 150 lb. pressure on the high side of the system and the cross slide and stylus approach the template. When the stylus 12 engages the template as shown in FIG. 2, there is an immediate increase in the restriction in valve 10, thus immediately increasing the back pressure in line 62 to a point where the pressure on the high side of the circuit equalizes the pressure on the low side of the system and advancing movement of the stylus 12 towards the template 14 is thus arrested.

To initiate the tracing cycle, a feed start switch, not illustrated, is actuated to energize solenoid 76 of valve 74. As is illustrated in FIG. 3, when solenoid 76 is energized, oil from the low pressure pump 34 is delivered through valve 74 and line 102 to the rod end of cylinder 26 rather than to the head end of cylinder 18. However, the head end of cylinder 18 is maintained under the pressure of the low pressure side of the circuit by the bypass line 122 which extends between the low pressure feed line 78 and line 104. Flow control valve 124 in bypass line 122 is set to permit a greater flow than the pressure compensated flow control valve 110 in line 108. The head end of the cross slide cylinder 18 is connected to sump only through flow control valve 110. Likewise, the head end of the longitudinal feed cylinder 26 is connected to the drain line 92 through line 94, the open check valve 100 and flow control valve 90. Since the rod end of longitudinal feed cylinder 26 is pressurized, the carriage 20 is fed in a direction toward the right at a rate controlled exclusively by the setting of the pressure compensated flow control valve 90. The stylus 12 thus traverses the longitudinal or axially extending straight edge 132 on template 14 until it abuts against the shoulder formed by the transversely extending edge 134 on the template.

Figure 4:
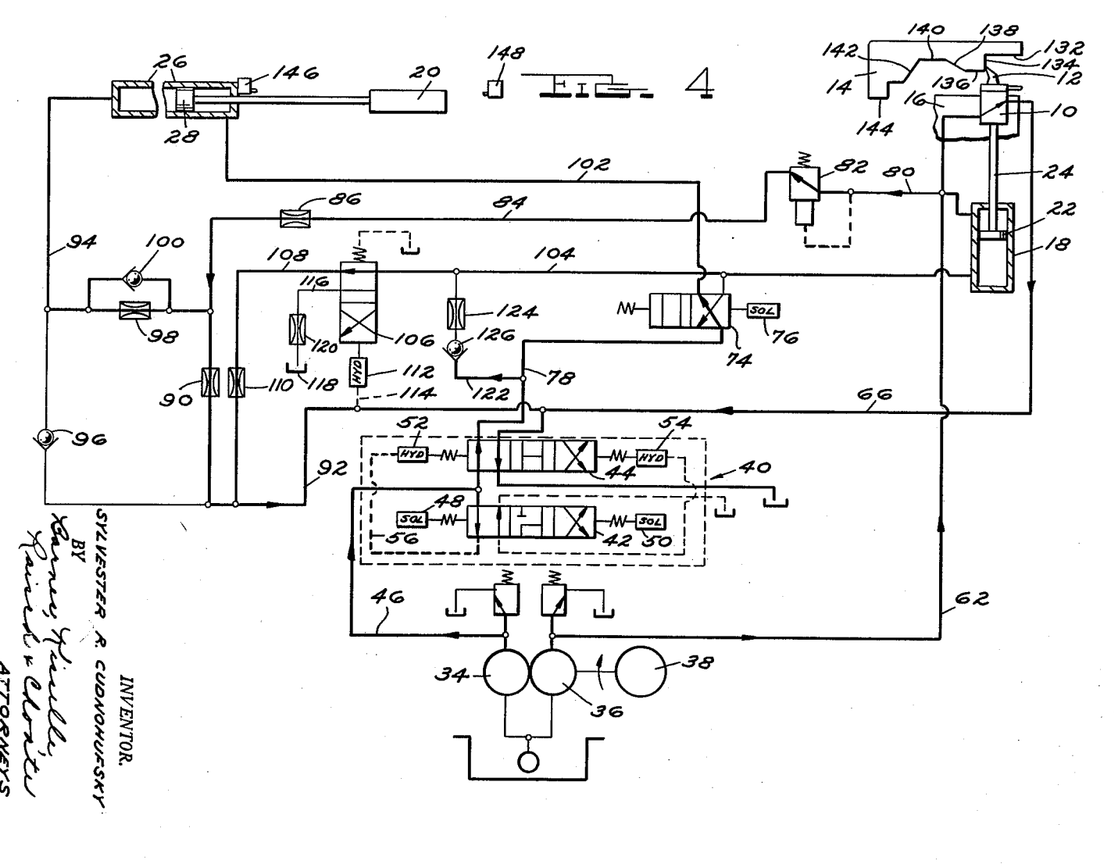
FIG. 4 is a view similar to FIG. 3 showing the control circuit with the tracer finger retracting along a radial or transverse shoulder on the template.

Referring now to FIG. 4, when the stylus 12 hits the shoulder formed by the edge 134 on the template, there is, of course, an immediate substantial increase in restriction in tracer valve 10. Thus, the back pressure in the feed line 62 and in the rod end of cylinder 18 immediately increases and this correspondingly increases the pressure on the head end of the transverse feed cylinder 18. The pressure in the head end of cylinder 18 immediately builds up to a value in excess of the pressure in the low pressure feed line 78 and check valve 126 immediately closes so that oil from the head end of cylinder 18 is discharged to sump through the pressure compensated flow control valve 110. It will be noted, therefore, that the maximum rate of retraction of the cross slide is controlled exclusively by the setting of the pressure compensated flow control valve 110.

When the back pressure in the feed line 62 exceeds a predetermined value, namely, a value corresponding to the setting of relief valve 82, valve 82 opens and oil under high pressure is admitted to line 84. The pressure in line 84 is exerted against the head end of longitudinal feed cylinder 26 through flow control valves 86 and 98. In the case of a right angle shoulder on the template such as indicated at 134, the volume of pressurized oil flowing through control 86 is sufficient to maintain full flow through pressure compensated flow control 90. Thus, there is no flow from the head of longitudinal feed cylinder 18 and longitudinal feed is arrested.

In this condition, the importance of the flow control valves 86 and 98 should be realized. If the entire flow of high pressure oil permitted by the opening of valve 82 surged directly to the head end of cylinder 26, then the piston 28 in cylinder 26 would tend to bounce back to the right, thus decreasing the restriction at valve 10 and the cutting tool would produce a rippled cut as the stylus 12 retracted along the shoulder formed by the edge 134 on the template. The flow control valves 86 and 98 prevent this sudden surge. Flow control valve 86 is set to permit a substantially higher flow than flow control valve 98. Valve 98 is pre-set so that it is almost closed. It is open just sufficiently to permit the pressure in line 84 beyond valve 86 to be exerted against the head end of cylinder 26. However, since, for reasons of economy, flow control valve 98 is not pressure compensated, and since the flow through relief valve 82 might, under some circumstances, be relatively high, flow control valve 86, which, like valve 98, is not pressure compensated, is located in series with valve 98 to restrict the flow to valve 98 to a volume such that although the pressure of line 84 is exerted immediately at the head end of cylinder 26, there will be substantially no flow through valve 98 in a direction toward the head end of cylinder 26. The series connection of flow control valves 86 and 98 thus enables the stylus to accurately follow the corner formed by the perpendicularly related edges 132 and 134 on the template.

As soon as the stylus 12 reaches the straight edge 136, the restriction in valve 10 is immediately reduced and the pressure in feed line 62 drops instantaneously and relief valve 82 closes. Thus, the circuit operates in the same manner as described above with reference to FIG. 3. As the stylus rides off the straight surface 136 unto the inwardly inclined surface 138, the restriction in valve 10 is further reduced to a point where the pressure at the head end of transverse feed cylinder 18 overcomes the pressure at the rod end of the cylinder so that the cross slide 16 is advanced toward the work. The conditions obtaining at the longitudinal feed cylinder 26 remain unchanged from what they were when the stylus 12 was riding along the straight edge 136 so that the carriage 20 is fed to the left at the same rate as controlled by the setting of flow control valve 90.

It will be observed that the infeed rate of the carriage 16 as the stylus rides along the incline 138 is controlled by the setting of the flow control valve 124 in bypass line 122. Thus, the setting of valve 124 in relation to the setting of valve 90 determines the maximum angle which the stylus 12 will follow in an infeed direction. Valve 124 is initially set such as to prevent the tool from plunging into the work as the stylus 12 rides off a longitudinally extending straight surface such as shown at 136 and unto an inwardly inclined surface 138.

When the stylus rides off the inclined surface 138 and onto the straight longitudinally extending edge 140 of the template, the circuit operates in the same manner as described with reference to FIG. 3. When the stylus leaves the straight surface 140 and rides onto the outwardly inclined surface 142, the circuit operates in somewhat the same manner as that described with reference to FIG. 4 with the exception, however, that the restriction at valve 10 will not be as great when the stylus travels along the edge 142 as it is when the stylus is travelling outwardly along the straight shoulder 134. However, the restriction is sufficient to open relief valve 82 and the pressure in line 84 acting on the head end of the piston in cylinder 26 is sufficient to slow down the movement of carriage 20 to the left, the oil flowing through line 84 maintaining the drain-line filled. It will be observed that at this time, the rate of movement of piston 28 to the left is determined by the rate of oil flow through the line 84 and flow control valve 86 because in any event, all the oil flowing through line 84 and being discharged from the head end of cylinder 26 must flow through the pressure compensated flow control valve 90. Flow control valve 98 may, if desired, be a fixed orifice valve. On the other hand, flow control valve 86 is adjustable. The setting of valve 86 is important. If valve 86 restricts the flow through line 84 too much, then the pressure in line 84 beyond valve 86 will not be sufficient to equalize the pressure at the head end of cylinder 26 when the stylus 12 engages a straight shoulder such as formed by the edge 134 on the template and the cutting tool would then dig into the work and possibly break. On the other hand, if the setting of valve 86 is such that the flow through line 84 is not sufficiently restricted, then there will be a tendency for the piston 28 to surge to the right when the stylus engages a straight shoulder and the cutting tool would cut a flutter instead of a clean, square corner.

The setting of valve 82 is determined by the inclination on the template at which it is desired to start slowing down the longitudinal feed. For example, if it is considered necessary to slow down the longitudinal feed rate when the tool feeds outwardly at an angle of at least 10° to the longitudinal axis of the work, then valve 82 would be set to open when the stylus encountered an angle of at least 10° on the template. With valve 82 set at this adjustment, when the stylus encountered an angle of 10° or greater, oil would be bled from the high side of the sytem through flow control valve 90 and the rate of longitudinal feed would be correspondingly diminished.

Figure 5:
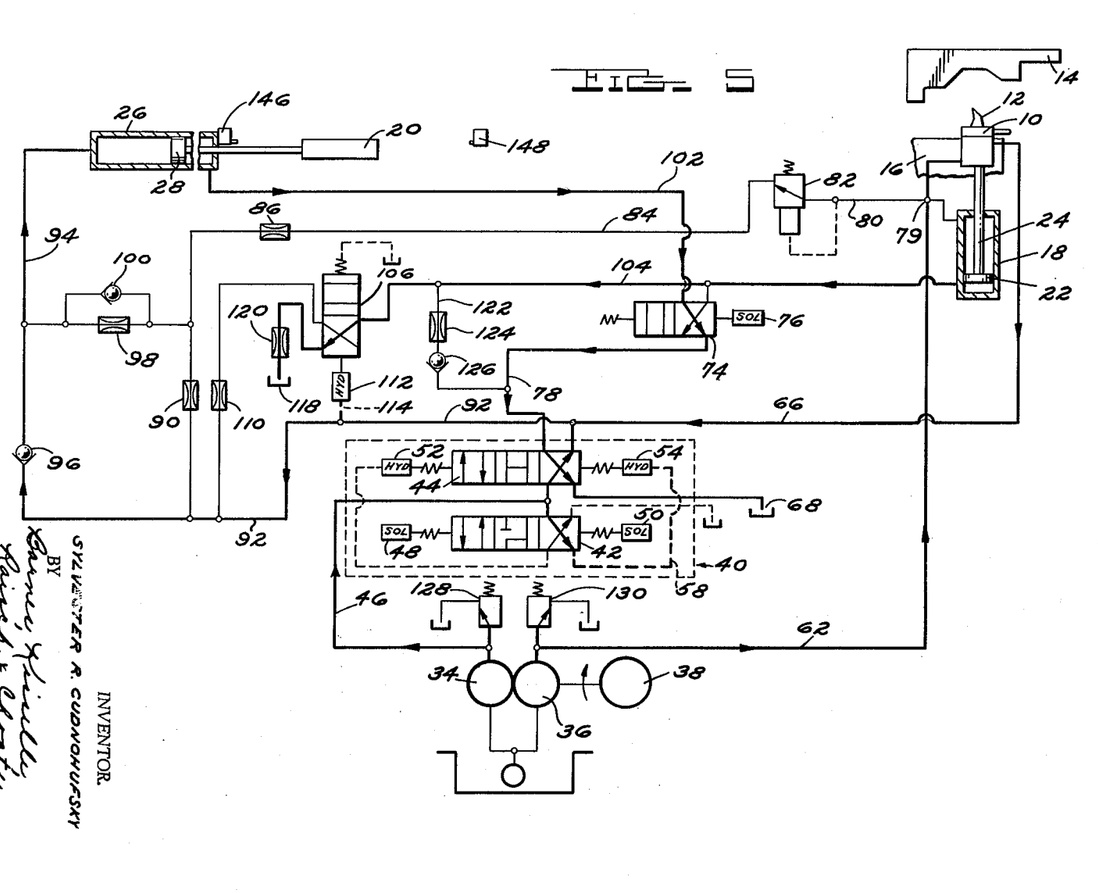
FIG. 5 is a view similar to FIG. 1 showing the control circuit conditioned to retract the tracting finger to the starting position.

Eventually, the stylus will follow the final tracing edge 144 on the template 14 and as the stylus approaches the left end of the template, the carriage 20 will actuate a switch 146. Switch 146 is designed to de-energize solenoid 48 and energize solenoid 50 of valve 42. This initiates retraction of the tool and stylus to the starting position as shown in FIG. 5. When solenoid 50 is energized, the pressure of the oil in the pilot line 58 actuates operating cylinder 54 of valve 44 so that oil from the low pressure pump 34 is directed to the head end of the longitudinal feed cylinder 26 through valve 44, line 92, open check valve 96 and line 94. At the same time, cylinder 112 of valve 106 becomes pressurized and shifts valve 106 so that line 104 from the head end of cylinder 18 is now connected to sump as at 118 through valve 106 and flow control valve 120. Thus, during the initial part of the retraction stroke, piston 28 shifts to the right at a maximum speed because the rod end of the longitudinal feed cylinder 26 is connected directly to sump at 68. However, the cross slide 16 retracts at a rate determined by the setting of flow control valve 120. For straight turning work such as shown in the drawings, valve 120 could be adjusted wide open to obtain retraction of the stylus and cutting tool both in a longitudinal and transverse direction at a maximum rate determined by the volumetric capacity of the high and low pressure pumps. However, if the cutting tool were a boring tool, then flow control valve 120 would be completely closed so that piston 22 in the transverse feed cylinder 18 could not retract until the carriage 20 had fully retracted, in which position it will actuate a second limit switch 148. When limit switch 148 is actuated, it de-energizes solenoids 76 and 50 so that valve 74 is shifted to the right under the influence of the spring bias thereon and pilot valve 42 will shift to the centered position. This places the circuit in the condition illustrated in FIG. 1 wherein the head end of cylinder 18 is connected directly to sump at 68 through the open center of valve 44.

Figures 7, 7A:
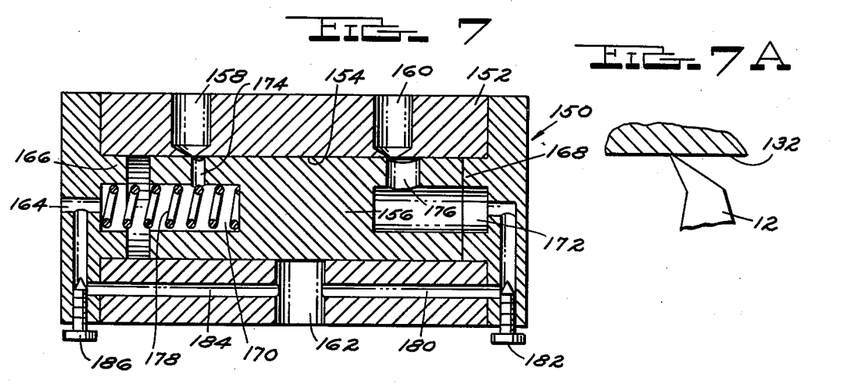
FIGS. 7, 7A, 8, 8A, 9 and 9A are sectional views showing the operation of the flow control valve of the circuit illustrated in FIG. 6 at various positions of the tracing finger or stylus during the tracing cycle.
Figures 8, 8A:
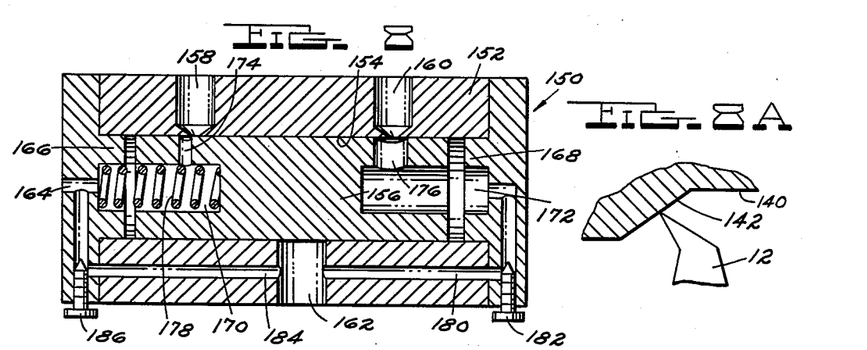
Figures 9, 9A:
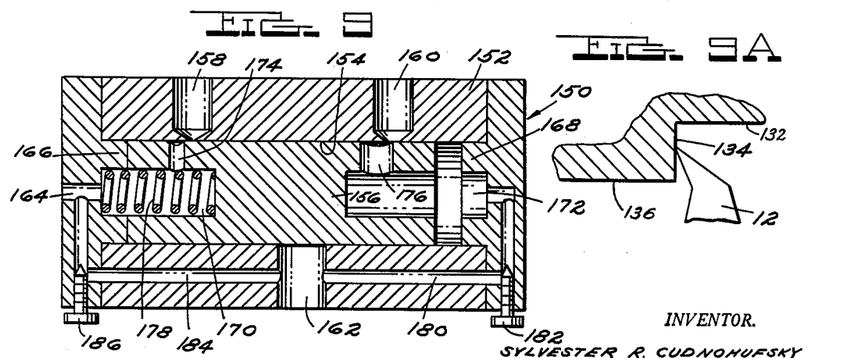

The arrangement shown in FIG. 6 is generally similar to that shown in FIGS. 1 through 5, with the exception, however, that the flow control valves illustrated at 86, 98, 90 and 110 are replaced with a flow integrator valve 150. As is shown in FIGS. 7 through 9, valve 150 includes a housing 152 provided with a central bore 154 in which a spool 156 is axially slidable. Housing 152 is provided with a port 158 to which the drain line 94 from the head end of cylinder 26 is connected. The line 108 connects with port 160 on housing 152 and the drain line 92 connects with an exhaust port 162 on housing 152. An end port 164 on housing 152 has the line 84 from relief valve 82 connected thereto. At opposite ends of the bore 154, the housing is provided with stops 166, 168 for limiting the extent of axial movement of spool 156 within the bore. Spool 156 is provided with axially extending recesses 170, 172 at opposite ends thereof. A radial passageway 174 in spool 156 opens into recess 170 at one end and at its other end is completely out of registry with port 158 when spool 156 abuts stop 166 (FIG. 9). Radial passsageway 174 is in partial communication with port 158 when the spool abuts stop 168 and when the spool is located intermediate the two stops 166, 168. A second radial passageway 176 in spool 156 has its inner end communicating with recess 172 and its outer end disposed adjacent port 160. Passageway 176 is substantially larger than passageway 174 and is in communication with port 160 regardless of the position of spool 156 in bore 154. Spool 156 is biased by a spring 178 in a direction toward the right as viewed in the drawings so that it abuts against the stop 168. Chamber 172 communicates with outlet port 162 through a passageway 180 in which is located a needle valve 182 for variably restricting passageway 180. Likewise, port 164 and recess 170 communicate with outlet port 162 through a passageway 184 which is similarly provided with a needle valve 186.

Flow integrator valve 150 in the circuit shown in FIG. 6 provides the same functions as valves 86, 98, 90 and 110 in the circuit shown in FIGS. 1 through 5. More specifically, the needle valves 182 and 186 in combination with the pressure compensated spool 156 assure a predetermined feed in both longitudinal and transverse directions of the cutting tool, which feeds are adjustable independently of one another. When the circuit illustrated in FIG. 6 is energized to cause the stylus to approach the template as is shown in FIG. 2 and the stylus abuts the template, its approach is arrested. Oil from the low pressure pump 34 flows through line 104 to port 160 of the integrator valve 150. Since the needle valve 182 is adjusted in accordance with the maximum flow desired, the restriction caused by needle valve 182 causes a build up of pressure in recess 172. This merely shifts the spool 156 to the left slightly from the position shown in FIG. 7 and the system will operate in this manner until the feed cycle is started. At this point, since there is no flow through line 84 and no flow in line 94, the oil pressure at ports 158 and 164 is substantially zero.

When the feed start switch is actuated to condition the circuit as shown in FIG. 3, the oil under pressure discharged from the head end of cylinder 26 flows to port 158; and since the needle valve 186 restricts the flow of oil from port 158 to the outlet 162, the pressure in recess 170 increases and the spring 178 shifts spool 156 to the right where it abuts against stop 168. However, port 158 is, as illustrated in FIG. 7, still slightly open. The pressure on the oil at both ends of the spool is substantially equal so the stylus feeds to the left along the longitudinally extending edge 132 of the template until it abuts the shoulder formed by the edge 134.

The operation of the integrator valve 150 when the stylus 12 hits the shoulder formed by the edge 134 on the template is illustrated in FIG. 9. When this occurs, as explained previously, the pressure at the head end of cylinder 18 immediately rises to a value such that the pressure at port 160 and in recess 172 is sufficient to compress spring 178 and shift spool 156 completely to the left and thereby close port 158. In this case, valve 82 is adjusted such that when the stylus hits a shoulder such as shown at 134, the high pressure at the head end of cylinder 18 is sufficient to shift the spool to the left so as to completely close port 158. With port 158 closed, it will be observed that discharge of oil from the head end of cylinder 26 is prevented and the stylus retracts along the edge 134 of the template at a rate determined by the setting of needle valve 182. It will be observed that as the pressure in recess 172 increases, spring 178 is compressed and the effective opening between port 160 and the radial passageway 176 is decreased. Thus, the integrator serves as a pressure compensated flow control valve.

The operation of the flow integrator 150 when the stylus encounters an inclined surface on the template such as shown at 142 is illustrated in FIG. 8A. Under this condition, the pressure in the head end of cylinder 18 rises to a value higher than that obtaining therein when the stylus is on a longitudinally extending surface such as at 132 or 140 but not as high as when the stylus hits a square shoulder. Thus, spool 156 is shifted to a position intermediate the two stops 166 and 168. The rate at which the stylus feeds outwardly is thus controlled by the setting of needle valve 182 and the rate at which the stylus feeds longitudinally is determined by the setting of needle valve 186. It must be remembered, however, that at this time, relief valve 82 is open so that a portion of the oil from the high pressure side of the system is flowing into the flow integrator 150 at port 164, thus diminishing the amount of oil that can be exhausted from the head end of cylinder 26 and thereby reducing the rate of longitudinal feed.

It will thus be seen that with both embodiments of the tracer control circuit described herein, the longitudinal and the transverse feeds can be controlled independently of one another. This is important for several reasons. In the first place, it enables the operator to adjust the two feeds such that a finer finish can be produced on the work piece where desired. For example, if the outer diameter of the work piece is required to have a smoother finish than other surfaces of the work piece, the operator merely adjusts the longitudinal feed by means of needle valve 186 or flow control 90, as the case may be, to produce the desired finish when the stylus is tracing the longitudinally extending edges of the template such as illustrated at 132, 140 and 144. It will also be apparent that where the two feeds can be controlled independently of one another in the manner illustrated where the drain lines from the head ends of both cylinders are not interconnected such that the oil cannot flow from the head end of the longitudinal feed cylinder to the head end of the transverse feed cylinder, the tracer is able to follow a more steeply inclined angled edge such as shown at 138.

I claim:

1. In a tracer control circuit for governing the operation of a pair of feed cylinders arranged to feed a cutting tool in angularly related directions, the combination of two sources of hydraulic pressure, one being capable of delivering a substantially higher pressure than the other, a tracer valve, a feed line connecting the tracer valve with the source of higher pressure, a pattern-controlled actuating means to control the tracer valve so as to variably restrict the flow therethrough and thereby vary the pressure in said feed line, means connecting the feed line with one end of one of said cylinders, a feed line extending from said source of lower pressure to one end of the other cylinder, the other ends of said two cylinders each having a drain line extending therefrom, means individual to each drain line for restricting the rate of exhaust flow from each cylinder to independent maximum values and means for establishing communication between the first feed line and the drain line from the second cylinder in advance of the flow restricting means therein when the pressure in the first feed line exceeds a predetermined value in excess of the pressure obtaining therein when the tracer valve is subjected to minimum restriction.

2. A tracer control circuit as called for in claim 1 including means in said last mentioned drain line interposed between the discharge end of the second cylinder and the means for establishing communication between the first feed line and the last mentioned drain line for preventing a sudden flow of hydraulic fluid from said communicating means to said second cylinder in response to a sudden wide differential in pressure between the drain line of the second cylinder and said first feed line.

3. A tracer control circuit as called for in claim 1 wherein said means for establishing communication between the first feed line and the drain line of the second cylinder comprises a bypass line extending between the first feed line and the drain line from the second cylinder upstream from the flow restricting means in the last mentioned drain line and valve means in said bypass line responsive to a rise in pressure in said first feed line to a predetermined value to open and thereby permit flow through said bypass line.

4. A tracer control circuit as called for in claim 3 wherein the extent of opening of said pressure responsive valve means is responsive to the pressure in said first feed line.

5. A tracer control circuit as called for in claim 3 wherein said bypass line includes a flow restricting valve therein and said drain line also includes a second flow restricting means therein, said second flow restricting means permitting free flow in the drain line in the direction from the second cylinder and restricting the flow in a direction to the second cylinder a substantially greater extent than the flow restricting means in the bypass line.

6. A tracer control circuit as called for in claim 3 including a second flow restricting means in said drain line from the second cylinder located upstream from the connection between the bypass line and the drain line, said second flow restricting means permitting free flow in the drain line in the direction from the second cylinder and restricting the flow in the direction from said bypass line to the second cylinder to an infinitely small value.

7. In a tracer control circuit for governing the operation of a pair of hydraulic feeding devices of a pattern-controlled machine, the combination of a source of relatively high pressure, a feed line connecting one of said feeding devices with said source of high pressure, a tracer valve for controlling the pressure of the fluid supplied by said source to said one feeding device, a source of lower pressure, a feed line connecting the source of lower pressure to the other feeding device, each of said feeding devices having a drain line extending therefrom, means individual to each of said drain lines for restricting the rate of exhaust flow from each cylinder to independent maximum values and means for feeding oil from the first mentioned feed line to the drain line for the second feeding device in advance of the flow restricting means therein for reducing the feed rate of the second feeding device when the pressure in the first feed line exceeds a predetermined value.

8. A tracer control circuit as called for in claim 7 wherein said means for feeding oil from the first said line to the drain line of the second feeding device includes means for preventing flow from the first feed line to the second feeding device through the drain line of the second feeding device.

9. A tracer control circuit as called for in claim 8 wherein said means for preventing flow to the second feeding device from the first feed line comprises a highly restricted flow control valve in said drain line from the second feeding device located upstream from the first mentioned flow restricting means in said drain line.

10. A tracer control circuit as called for in claim 8 wherein said means for preventing flow to said second feeding device from said first feed line includes a unidirectional valve means for permitting unobstructed flow in a direction from the second feeding device to the flow restricting means in the drain line for the second feeding device.

11. A tracer control circuit as called for in claim 8 wherein said means for preventing flow from the first feed line to the second feeding device comprises a pressure responsive valve means in the drain line for the second feeding device for positively closing said drain line from the second cylinder.

12. A tracer control circuit as called for in claim 9 wherein said pressure responsive valve means closes in response to a rise in pressure in said bypass line above a predetermined value.

13. In a tracer control circuit for governing the operation of a pair of hydraulic feeding devices of a pattern-controlled machine, the combination of a source of relatively high pressure, a feed line connecting one of said feeding devices with said source of high pressure, a tracer valve for controlling the pressure of the fluid supplied by said source to said one feeding device, a source of lower pressure, a feed line connecting the source of lower pressure to the other feeding device, each of said feeding devices having a drain line extending therefrom, means individual to each of said drain lines for restricting the rate of exhaust flow from each cylinder to independent maximum values irrespective of the pressures therein and means for feeding oil from the first mentioned feed line to the drain line for the second feeding device in advance of the flow restricting means therein for reducing the feed rate of the second feeding device when the pressure in the first feed line exceeds a predetermined value.

14. A tracer control circuit as called for in claim 13 wherein said means for restricting the rate of exhaust flow from each cylinder comprise adjustable, pressure compensated flow control valves.

15. A tracer control circuit as called for in claim 14 wherein said means for feeding oil from the first mentioned feed line to the drain line for the second feeding device comprises a bypass line extending from said first feed line to the drain line for the second feeding device upstream from the pressure compensated flow control valve therein, said bypass line having a valve therein for controlling the flow through the bypass line, said last mentioned valve being responsive to open when the pressure in the first feed line exceeds a predetermined value.

16. A tracer control circuit as called for in claim 15 wherein the degree of opening of said last mentioned valve is determined by the extent to which the pressure in the first feed line exceeds said predetermined value.

17. A tracer control circuit as called for in claim 15 wherein said bypass line includes a flow control valve therein which is not compensated for pressure, said last mentioned flow control valve being set to permit a rate of flow in said bypass line greater than the rate of flow permitted by the pressure compensated flow control valve in the drain line from the second feeding device.

18. A tracer control circuit as called for in claim 17 including a uni-directional flow control valve in the drain line from the second feeding device located upstream from the connection of said bypass line with said drain line from the second feeding device, said uni-directional flow control valve permitting free flow in said drain line in a direction from said second feed device and restricting the flow from the bypass line to the second feeding device to an infinitely small value.

19. In a tracer control circuit for governing the operation of a pair of hydraulic feeding devices of a pattern-controlled machine, the combination of a source of relatively high pressure, a feed line connecting one of said feeding devices with said source of high pressure, a tracer valve for controlling the pressure of the fluid supplied by said source to said one feeding device, a source of lower pressure, a feed line connecting the source of lower pressure to the other feeding device, each of said feeding devices having a drain line extending therefrom, flow integrator valve means having a pair of inlet ports to which said drain lines are connected, said integrator valve means having a pair of passageways therein extending from said inlet ports to an outlet port, said passageways each including pressure compensated flow restricting means therein, said integrator valve means having a third port thereon communicating with the passageway extending from the port connected with the drain line from the second feeding device, a bypass line extending from the first feed line to said last mentioned port on said integrator valve means and means for closing the port connected with the drain line from the second feeding device when the pressure in the first feed line exceeds a predetermined maximum value.

20. In a tracer control circuit for governing the operation of a pair of hydraulic feeding devices of a pattern-controlled machine, the combination of a source of relatively high pressure, a feed line connecting one of said feeding devices with said source of high pressure, a tracer valve for controlling the pressure of the fluid supplied by said source to said one feeding device, a source of lower pressure, a feed line connecting the source of lower pressure to the other feeding device, each of said feeding devices having a drain line extending therefrom, flow integrator valve means having a pair of inlet ports to which said drain lines are connected, said integrator valve means having a bore communicating with said inlet ports, outlet port means on said integrator valve means, individual passageways extending from opposite ends of said bore to said outlet port means, a spool shiftable axially in said bore, said spool having a pair of radial passageways therein communicating with opposite ends of said bore, spring means biasing said spool axially toward one end of the bore to a position wherein the port connected with the drain line from the first feeding device registers with one of said radial passageways and the port connected with the drain line from the second feeding device is in partial registry with the other radial passageway, a bypass line extending from the first feed line to the end of said bore opposite that against which the spool is biased by the spring so that the pressure in said bypass line acts on the spool in the same direction as the spring, said ports being located relative to the bore such that when the spool shifts to the end of the bore to which said bypass line is connected, the port to which the drain line from the first feeding device is still in partial registry with said one radial passageway and the port connected with the drain line from the second feeding device is completely out of registry with the second radial passageway and adjustable flow restricting means in each of the passageways extending from opposite ends of the bore to said outlet port means.

21. A tracer control circuit as called for in claim 20 including a pressure-responsive valve means in said bypass line for permitting flow from the first feed line to said integrator valve means when the pressure in the first feed line exceeds a predetermined value.

No references cited.